UNITED STATES PATENT OFFICE 2,327,338

INSECT CONTROL

Thomas S. Carswell, Longmeadow, Mass., assignor to Monsanto Chemical Company, St. Louis, Mo., a corporation of Delaware No Drawing. Application December 13, 1939, Serial No. 308,943

20 Claims. (Cl. 167—30)

The present invention relates to the control of insects and similar pests and refers to a new class of substances for such purpose, which substances are alkyl ethers of polychlorophenols (alkyl-polychloroaryl ethers) having more than two chlorine atoms in the aromatic hydrocarbon radical such as alkoxytrichlorobenzenes, alkoxytetrachlorobenzenes and alkoxypentachlorobenzenes.

The principal object of this invention is to provide a class of insecticides which may be used for the control of insects and similar pests, which insecticides shall be safe to use and handle and shall have no staining or other deleterious effect on materials to which insecticides are ordinarily applied. It is a further object of the invention to provide a method of formulating the insecticides to obtain most favorably these objects and to permit of most advantageous application of the insecticide to the materials to be protected. Other objects and advantages of the invention will be apparent from the description which follows hereinafter.

The present invention is based on the discovery that alkyl ethers of polychlorophenols (alkyl-polychloroaryl ethers) are especially effective insecticides for the control of moths, carpet beetles, bed bugs, ambrosia beetles and similar insects. These substances are of inferior value, however, when used as fungicides or ovicides, for example, for the destruction of milkweed bug eggs, in comparison with known fungicides and ovicides. In this respect, these toxic agents exhibit a considerable degree of specificity toward insects.

The butyl ether of pentachlorophenol (butoxypentachlorobenzene) is a specific example of alkyl ethers of polychlorophenols (alkyl-polychloroaryl ethers) whose use is contemplated in the present invention. In general, alkyl ethers of polychlorophenols which exhibit this especially effective insecticidal action and specificity are the alkyl-polychloroaryl ethers having more than two chlorine atoms substituted in the aromatic hydrocarbon radical such as alkyl-trichlorophenyl, alkyl-tetrachlorophenyl and alkyl-pentachlorophenyl ethers. The alkyl radicals of the alkyl ethers of polychlorophenols may be methyl, ethyl, propyl, butyl, amyl, hexyl, octyl, dodecyl and higher alkyl radicals, which may possess primary (which may be normal or branched chain isomers) secondary or tertiary configurations.

The alkyl-polychloroaryl ethers of the present invention may be represented by the general formula Alkyl—O—Polychloroaryl in which the polychloroaryl radical contains more than two chlorine substituents. The alkyl-polychlorophenyl ethers in which the polychloroaryl group is a benzene radical having more than two chlorine substituents, such as is represented by the following formula

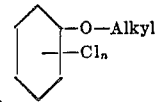

in which $n$ is a whole number greater than two, may also be designated generically as alkoxypolychlorobenzenes or polychlorophenoxyalkanes. However, for convenience, the compounds are referred to herein as alkyl ethers of polychlorophenols, since they are generally made and may be considered to be derived by alkylation of the phenolic hydroxyl group of a polychlorophenol, the connecting oxygen atom of the ether being the oxygen of the hydroxyl group of the polychlorophenol. Thus, the butyl ether of pentachlorophenol, which may also be called butoxypentachlorobenzene and butyl-pentachlorophenyl ether, is the compound of the formula

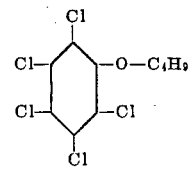

the octyl ethers of pentachlorophenol have the formula

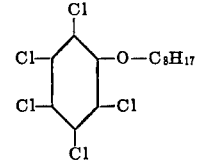

and may also be called octoxypentachlorobenzenes and octyl-pentachlorophenyl ethers; the dodecyl ethers of pentachlorophenol have the formula

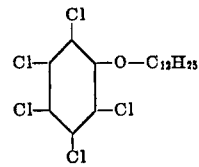

and may also be called dodecoxypentachlorobenzenes and dodecyl-pentachlorophenyl ethers. It is to be understood that only this type of compound is referred to herein by the use of terms such as alkyl ether of a polychlorophenol, butyl ether of pentachlorophenol, and the like.

Certain of these alkyl ethers of polychlorophenols have been heretofore described and prepared. The methyl, ethyl, propyl and butyl ethers of pentachlorophenol, the methyl and ethyl ethers of 2,3,4,6-tetrachlorophenol and the methyl and ethyl ethers of 2,4,6-trichlorophenol and methods for their preparation are described in Beilstein, "Handbuch der organischen Chemie", fourth edition, vol. VI, pages 192, 193, 195 and 196. The general methods used for the preparation of the ethers may be used to prepare corresponding higher alkyl ethers of these and other isomeric polychlorophenols. In the practice of this invention, mixtures of various alkyl ethers of polychlorophenols may also be used.

Alkyl ethers of polychlorophenols are generally liquids which are applied most conveniently in diluted form to the material to be protected. The most advantageous form in which to apply them will be dependent somewhat upon the particular insect to be controlled and the material to be protected but in general the compounds may be applied in solution in a suitable solvent or in the form of an aqueous emulsion. The application to the material to be protected can be made by spraying, dipping, brushing and like methods and these treatments may be varied in degree to obtain a range from a mere superficial coating of the compound on the material to be protected to complete impregnation of the material by the compound. Thus, for protecting growing plants, application of a dilute aqueous emulsion of an oil solution of the compounds to the plants by spraying to obtain an adherent superficial coating on the plant is generally adequate protection against ordinary aphids and other insects that cause plant injury, whereas application of the compounds in the form of a concentrated solution in oil to green logs by spraying to obtain a relatively heavy superficial deposit of the insecticide on the log is desirable to protect green logs from damage by ambrosia beetles. At the other extreme, textile materials such as wool felts may best be protected by complete impregnation of the textile with a concentrated solution of the insecticide in oil. The methods of using the insecticides of the present invention in general follow the methods heretofore used for providing control of insects by similar insecticidal materials. Representative methods of applying the insecticides to specific materials to obtain adequate protection against specific insects are described in greater detail hereinafter.

A relatively large number of solvents for alkyl ethers of polychlorophenols are available, but in formulating these substances in insecticidal compositions preference is given to low-cost liquids such as gasoline, kerosene, heavier petroleum oils of the lubricating or fuel-oil boiling range, Deo-Base oil, benzene, toluene, petroleum ether, acetone, carbon tetrachloride, etc. Alkyl ethers of polychlorophenols are soluble in ethers such as ethyl ether and dioxane; in hydrocarbons such as the specified petroleum hydrocarbon fractions, hexane, aromatic hydrocarbons such as benzene, toluene and xylene, and hydrogenated aromatic hydrocarbons such as cyclohexane, tetrahydronaphthalene and decahydronaphthalene; in esters such as ethyl acetate, butyl acetate, amyl acetate and the like; in chlorinated hydrocarbons such as chloroform, carbon tetrachloride, ethylene dichloride, amyl chloride, trichlorobenzene and the like; in carbon bisulfide; in oils such as linseed oil, tung oil, pine oil, etc.; and in sulfonated oils such as sulfonated castor oil, etc.; but are not substantially soluble in alcohols such as ethyl alcohol, ethylene glycol and glycerol, and also in methyl cellosolve (monomethyl ether of ethylene glycol) and diethylene glycol. The foregoing solvents or mixtures thereof may be used for preparing solutions of the insecticidal compounds. The choice of solvent or solvent mixture to use for any particular insecticidal composition will be dependent to some extent upon considerations of rapidity of penetration, rate of evaporation, residual solvent odors or stains, toxicity, inflammability and the like.

Aqueous emulsions of alkyl ethers of polychlorophenols prepared by dissolving the ether in a water-immiscible solvent such as mineral oil and thereafter dispersing this solution in water with or without an emulsifying agent, may be used for plant sprays. The dilution of the insecticide will be dependent somewhat on the insect to be controlled.

The invention will be further exemplified with particular reference to the protection of specific materials from attack by specific insects. These methods of applying the insecticides are merely exemplary. The results of comparative tests of the insecticides of the present invention with those heretofore used for the protection of the particular material from insect attack are also referred to in order to illustrate the effectiveness of the insecticides and to indicate the nature of the control methods which can be adapted to other specific insect control problems.

Mothproofing

Insects which are responsible for depredations in textile materials, particularly woolen materials, include moths and carpet beetles. More textile damage is probably attributable to carpet beetles than to moths since their natural mortality in the home is less than that of moths and since they are a more voracious insect. Clothes-moth larvae, furthermore, do not feed on wool for a long period whereas carpet beetles can subsist on pure wool. Many commercial preparations designed to prevent clothes-moth damage will not kill carpet-beetle larvae before they have eaten a considerable amount of treated wool.

The felts composing the hammers of pianos are particularly subject to attack by carpet beetles and the treatment of such felts to prevent their damage by insects has been a problem the solution of which has been attended with only indifferent success. The problem of mothproofing felt piano hammers and that of mothproofing clothes and similar woolen materials are not unlike each other, although certain secondary characteristics of the insecticidal material are more important in considering one problem than in considering the other. Thus a primary consideration of the insecticide which is to be used in treating woolen cloth is its effect on human skin while in the case of treating piano hammers the corrosive effect on steel-wire strings upon which the hammers impinge in their normal use and the factor of penetration of the insecticidal composition into the compressed wool felt composing the hammer are of paramount importance. Besides its high toxicity or repellent action to all fabric insects, a protective substance for preventing insect damage to woolen materials in their general uses should be:

1. Non-deleterious to woolen fibers,
2. Effective for long periods,
3. Non-irritating to human skin,
4. Non-corrosive to metals and polished wood surfaces,
5. Non-staining to textiles, particularly textiles colored with certain dyes,
6. Characterized by considerable penetrating action into woolen fibers, and
7. Substantially non-volatile and odorless.

The alkyl ethers of polychlorophenols of the present invention meet to an admirable degree these requisites.

In using these insecticidal materials for treating woolen fibers and fabrics to protect them from insecticidal damage, the insecticidal material is preferably used in solution in an organic solvent. Generally 1%, or less, to 20%, or more, of the insecticidal material in the solvent will provide sufficient protection by a single application. For treating clothes, a solution of the insecticidal material in benzene, chlorinated aliphatic hydrocarbons or similar relatively volatile organic solvents may be used. This solution may be sprayed onto the clothes or the clothes may be dipped into such a solution and dried thereafter. Such a dipping procedure is particularly useful as a finishing operation after dry-cleaning. Aqueous emulsions of the insecticides may be used for this purpose if the fabric is not particularly susceptible to spotting by water.

For treating woolen felt hammers and the like the insecticide may be employed in a less volatile solvent than would be used for the treatment of clothes so that greater penetration of the insecticide is induced. To facilitate such penetration surface-tension reducing agents may be added to the compositions. Since mildew is another source of damage connected with wool felts and since the alkyl ethers of polychlorophenols are but relatively mild fungicides, the addition of known mildewproofing agents such as pentachlorophenol or tetrachlorophenols may be added to the compositions for this added protection. The swelling action induced by water on woolen fibers and the possible retention of water in the felts, which might hasten corrosion of metals, render aqueous emulsions of the insecticidal materials less desirable for this use than solutions in oil or other substantially anhydrous organic solvents.

The following results illustrate the effectiveness of the insecticidal materials in comparison with other materials which have been recommended for mothproofing. In these tests, the insect used was the black carpet beetle, *Attagenus piceus*, one of the largest and most voracious members of the group. White flannel cloth was cut into circles of uniform size and allowed to remain in the indicated preparation until thoroughly wet. The circle was then placed on a metal screen and allowed to drain and dry. The treated circle was cut in half and the two pieces were clipped together to obtain a double thickness of the cloth and this was then placed in a Petri dish. A control sample, which was impregnated only with the solvent used and allowed to dry, was placed in the same Petri dish with the treated sample. To the Petri dish were then added 10 larvae of the black carpet beetle and the dish was then set aside and observed at intervals. At each inspection the number of dead and living larvae was counted and recorded, the relative number feeding on the treated and untreated samples was also observed and the dead larvae were removed. After the larvae were all dead or the test had progressed for three weeks or longer, the cloths were examined under a microscope to determine the extent of the damage to the treated and untreated cloths. After the tests had progressed three weeks, the untreated cloth was removed from the Petri dish and the larvae had to feed on the test piece, or starve. By this means an estimation of the relative repellency of the treated sample was obtained, that is, it was possible to observe whether the insect would feed on the treated sample when untreated material was available and also, after the untreated sample was removed, whether the insect would feed on the treated sample when no other food was available. The results of such tests on flannels treated with the indicated materials were as follows:

| | |
|---|---|
| Butyl carbitol thiocyanate | Highly volatile and ineffective in 10, 5 and 1% concentrations in Deo-Base oil. |
| Allyl isothiocyanate | Ineffective in 10, 5 and 1% concentrations in Deo-Base oil. |
| 2,4-dinitro-6-cyclohexyl phenol (1% solution in Deo-Base oil). | All larvae dead after 20 days; stains wool. |
| Isoquinoline (5% solution in Deo-Base oil). | Non-toxic but repellent; stains wool. |
| Pyridine (5% solution in Deo-Base oil). | Non-toxic but somewhat repellent; very volatile. |
| Sodium fluosilicate (1 oz. to 1 gal. of water.) | No larvae dead in first four weeks. Test piece showed no injury after three weeks. |
| Butyl pentachlorophenyl ether (10% in Deo-Base oil). | First larvae dead at 7 days; all 10 dead at end of 14 days. No injury to wool detectable. |

*Ambrosia-beetle control*

Ambrosia-eating beetles, or, as they are more commonly called, ambrosia beetles, are comprised in the group of wood-boring Scolytidae of the order Coleoptera which feed not upon wood but upon a substance called "ambrosia." These ambrosia are certain fungi propagated by ambrosia beetles on the walls of their galleries in the wood. A definite symbiotic relationship between the beetles and these ambrosia fungi has been found to exist. There are several varied forms of ambrosia fungi which appear to be associated with different species of ambrosia beetles, but most of them are chromogenic organisms belonging to the group known as sap-stain organisms. The sap-stain organisms which are referred to as ambrosia fungi have been studied but not definitely identified (see C. T. Rumbold, J. Agricultural Research, 1931, vol. 43, pages 848 and 849). The methods by which these chromogenic fungi are carried may be mere mechanical carriage on the body of the insect or on mites carried by the insect or they may be carried in the intestinal tract of the insect and disseminated therefrom. The exact mechanism of carriage of chromogenic fungi has not been ascertained but it has been definitely established that where ambrosia beetles are found there also are found chromogenic fungi. Typical ambrosia beetles are *Xyleborus dispar, Xyleborus pubescens, Monarthrum mali, Xyloterus retusus, Platypus compositus, Corthylus punctatissimus, Gnathotrichus materiarius*, and the group includes species of the genera, Xyleborus, Xyloterus, Platypus, Corthylus, Monarthrum and Gnathotrichus. More than thirty species of ambrosia beetles distributed in these six genera are known to occur in the United States. Ambrosia beetles, the ambrosia fungi and their life habits have been described by Henry G. Hubbard in the Yearbook of the U. S. Department of Agriculture, 1896, pages 421 to 430 and Bulletin No. 7 New Series of the Division of Entomology, pages 9 to 30 (1897), although the conclusions therein with regard to the ambrosia fungi have been somewhat modified by latter researches by other investigators.

Because of their dependence upon ambrosia as food and because the ambrosia fungi require moisture for growth, the depredations of ambrosia beetles are manifested most frequently in recently-felled timber and green unseasoned lumber. The beetles in forming their galleries bore through the wood and thereby decrease its strength and prevent its use for certain purposes, whereas the ambrosia fungi leave stains which detract from the appearance and usefulness of the wood. Ambrosia beetle attack represents a loss of considerable magnitude to the lumber industry, particularly that of the Southern states where ambrosia beetles are widely distributed and their attacks are of great intensity. Ambrosia beetles attack all green woods and their flight period in the Southern states extends approximately from March 15 to November 1.

In view of the unique life habits of ambrosia beetles, methods for controlling them have been especially unsatisfactory. In general it may be said that toxic insecticides applied to the bark of trees or logs or applied to surfaces of green unseasoned lumber provide no control since the insect can bore through the toxic coating and the superficial layers of the tree or log and establish a colony in the interior of the wood. Fungicides applied to the bark of the trees or logs or to green wood surfaces are also of substantially no benefit since the ambrosia fungus, without which the insect cannot live, is grown below the surface of the wood. F. C. Craighead (U. S. Department of Agriculture Bulletin No. 1079, August, 1922) found that wood which had been submerged in a solution of sodium arsenate for 48 hours and then dried was attacked by ambrosia beetles and that the poison did not deter nor injure the beetles. Impregnation of the log with a toxic material to considerable depth beneath the surface might impede the growth of the ambrosia fungus but would be of little protective value against the insect since the insect does not utilize the wood as food. However, even if impregnation treatments were found to be effective, they are expensive and their use is not practicable. The greatest damage from ambrosia beetles is occasioned before the timber reaches the mill, that is, while the felled timber is awaiting transportation to the mill. The only possible treatment which could be economically applied to the logs in the field is a simple coating or spraying operation.

Treatments or remedies which have been heretofore recommended for the control of ambrosia beetles include coating the logs with creosote or kerosene. These have been found to be insufficiently effective. In Bulletin No. 1079 of the U. S. Department of Agriculture (August, 1922) F. C. Craighead disclosed experiments with spray solutions for preventing insect injury to green logs, among which were detailed some experiments on controlling ambrosia beetle attack with various materials, including a mixture of kerosene and creosote oil, a mixture of pyridine and kerosene, and a solution of corrosive sublimate; the latter was the least effective. In U. S. Patent 2,164,328, granted to Harold R. Hay, are disclosed tests with various other compounds, solutions of which were sprayed on green logs. In these tests diphenyl and diphenyl-benzenes ("triphenyls") were found to be the best ambrosia beetle repellents and logs treated with cresylic acid, trichlorobenzene, chlorinated diphenyls (42% and 54% combined chlorine content) and benzyl phenol were more attacked than untreated logs whereas beta-naphthol, ortho-dichlorobenzene, para-dichlorobenzene and cyclohexylamine gave some degree of control but not of the same order as that observed with diphenyl. The control of ambrosia beetles is a rather specific problem and toxicities of an insecticidal or fungicidal material are of little value in predicting effectiveness of a material as a control medium for these insects.

Compositions containing the alkyl ethers of polychlorophenols of the present invention provide a simple method of controlling ambrosia beetle attack on green lumber by a simple coating or spraying operation. These insecticidal materials are highly repellent to ambrosia beetles, are free from odors objectionable to man, and are non-toxic to higher forms of animal life. They leave a relatively permanent coating upon application to wood, which coating is not substantially affected by weathering; they do not stain or decompose wood to which they are applied or affect varnishes or paints which are subsequently applied to the wood, and their use is not attended with any substantial fire hazard.

These compounds and solutions containing them, when used for the control of ambrosia beetles, are referred to as ambrosia-beetle repellents or ambrosiacides. Whether their action is attributable to their taste, their odor or their toxicity to fungi or to the insects or to a combination of all these properties, has not been ascertained. The terms ambrosia-beetle repellent and ambrosiacide are therefore not to be understood to refer to any particular killing or repelling action of the material but are to be construed as referring broadly to any action upon ambrosia beetles or the fungi associated therewith whereby the materials treated with the compound are rendered undesirable as a habitation or rendered destructive to the insects or their fungi and attack by the beetles or fungi associated therewith is thereby prevented.

For preventing attack of ambrosia beetles upon green logs or lumber the repellent compound may be employed in various concentrations. The greater the concentration of the solution, the heavier is the deposit left on the treated material and hence the more protected is the treated material. The concentration to use will be dependent to a considerable extent upon the method of application and the quantity of solution left on the surface of the treated material. Generally, solutions containing from 5% to 35% are sufficiently concentrated and will provide with a single dipping, spraying or brushing application of the solution, a coating that is resistant to attack by ambrosia beetles for long periods.

In applying the solutions, either dipping, spraying, or brushing may be used. In the case of green logs it should be applied over the bark; the ends of the logs should also be coated in order to prevent the entrance of beetles parallel to the grain of the wood. Lumber may be treated at the mill after it is cut, preferably by a dipping operation, or it may be treated while in stacks by spraying.

Ambrosia beetles are most destructive to freshly cut logs or to lumber prepared therefrom. After the surface of the wood has become dry, usually within twenty or thirty days in the case of cut lumber, it becomes comparatively immune from attacks of ambrosia beetles, therefore the permanence of the coating after this period is not a critical consideration.

The repellent compounds of the invention may be used together with known insecticidal or fungicidal materials. Thus, a solution may be prepared to provide protection not only against ambrosia beetles but to prevent attack by other insects and to provide prolonged protection from fungi. As an example of a composition that may be applied to fresh-cut lumber to provide prolonged protection from termites and sap-stain fungi and to provide protection from ambrosia beetles, I have used a solution consisting of 5 parts of pentachlorophenol, 5 parts of the butyl ether of pentachlorophenol and 5 parts of ester gum (to prevent blooming) dissolved in 100 parts of petroleum solvent of the fuel oil boiling range. This composition is preferably applied by dipping so as to secure adequate penetration of the toxic materials.

To illustrate the efficacy of the alkyl ethers of polychlorophenols of my invention the results of a series of tests in which one of these ambrosiacides was compared with other materials are shown in the table below. In these tests a series of strips of sap gum wood approximately 1¼ inches x 4 inches x 12 inches were dipped into the solutions indicated and the solution was allowed to drain from the pieces. These strips of wood were then placed in a cage in which were contained pieces of sap wood heavily infested with ambrosia beetles and the progress of the attack of the test pieces by the ambrosia beetles and the progress of the attack by sap-staining fungi were noted periodically. The growth of the fungi was observed by appearances and recorded as light, heavy or medium. The attack by the ambrosia beetles was observed by counting the number of holes found in the test pieces and was recorded as unattacked, light, medium or heavy. A light attack was considered as 1 to 10 holes in the test piece, a medium attack as one resulting from the presence of 11 to 30 holes in the test piece and the attack was designated as heavy if more than 30 holes were found in the test piece. The test was relatively severe inasmuch as it represents extreme conditions which probably would not actually be found in practice.

| Composition tested | Period, days | Ambrosia beetle attack | Blue stain fungus attack |
|---|---|---|---|
| Butyl ether of pentachlorophenol 5% in kerosene 95%. | 18 | Unattacked | Heavy. |
| Hexachlorobenzene 23% and kerosene 77%. | 33 | Heavy | Do. |
| Chlorinated diphenyl (42% chlorine) 20% and kerosene 80%. | 33 | do | Do. |
| Pentachlorophenol 5%, fuel oil 90% and ester gum 5%. | 37 | do | Light. |
| N-amyl-N-benzyl cyclohexylamine 15% and kerosene 85%. | 18 | do | Medium. |
| Benzene 100% | 18 | do | Do. |
| Toluene 100% | 37 | do | Heavy. |
| Kerosene 100% | 37 | do | Medium. |
| Control | 13 | do | Heavy. |

Although the repellent compound is applied preferably in solution as described hereinabove, it may also be applied, if desired, in the form of a suspension or emulsion which can be prepared in usual manners with water. In either case, the use of agglutinants, to insure the adherence of the repellent compound to the wood, as is well understood by those skilled in the art, may be desirable. The application of the repellent compounds in the liquid or molten condition may be resorted to for the application of heavy coatings.

Although I have shown and described preferred forms of the invention, it is to be understood that the invention is not limited thereto. The compounds of my invention may be used for the control of aphids on growing plants, and for the control of bed bugs and mosquito larvae. The compounds are used for these purposes according to the generally known methods for preparing and applying insecticidal compositions that are used for the control of these insects by other organic insecticides. It is therefore to be understood that the invention is to be limited solely by the appended claims.

I claim:

1. A mothicide and ambrosiacide which comprises an alkoxypolychlorobenzene of the following formula:

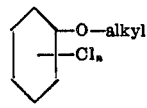

in which $n$ is a whole number greater than two.

2. A mothicide and ambrosiacide which comprises an alkoxytetrachlorobenzene of the following formula:

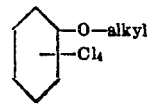

3. A mothicide and ambrosiacide which comprises an alkoxypentachlorobenzene of the following formula

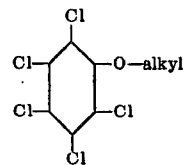

4. A mothicide and ambrosiacide which comprises a butoxypentachlorobenzene of the following formula:

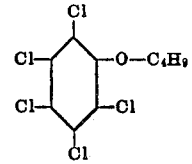

5. A mothicide and ambrosiacide which comprises an octoxypentachlorobenzene of the following formula:

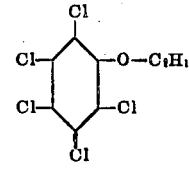

6. A mothicide and ambrosiacide which comprises a dodecoxypentachlorobenzene of the following formula:

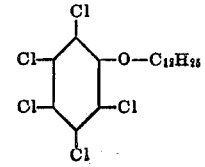

7. A mothicidal and ambrosiacidal composition which comprises a petroleum hydrocarbon solvent having dissolved therein an alkoxypolychlorobenzene of the following formula

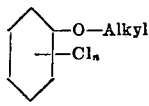

in which $n$ is a whole number greater than two.

8. A mothicide which comprises an alkoxypolychlorobenzene of the following formula:

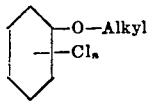

in which $n$ is a whole number greater than two.

9. A mothicide which comprises an alkoxypentachlorobenzene of the following formula:

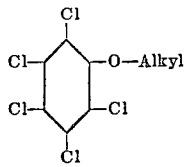

10. A mothicide which comprises a butoxypentachlorobenzene of the following formula:

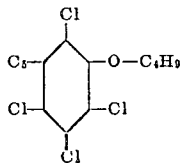

11. The method of protecting woolen materials from damage by insects which comprises applying to said materials a mothicide comprising an alkoxypolychlorobenzene as defined in claim 8.

12. Mothproof animal fibers the superficial layers of which are coated with a mothicide comprising an alkoxypolychlorobenzene as defined in claim 8.

13. An ambrosiacide which comprises an alkoxypolychlorobenzene of the following formula:

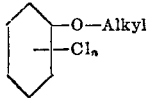

in which $n$ is a whole number greater than two.

14. An ambrosiacide which comprises an alkoxypentachlorobenzene of the following formula:

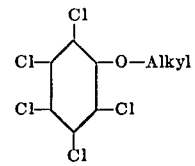

15. An ambrosiacide which comprises a butoxypentachlorobenzene of the following formula:

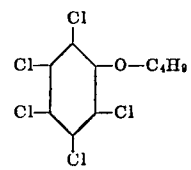

16. An ambrosiacide which comprises a dodecoxypentachlorobenzene of the following formula:

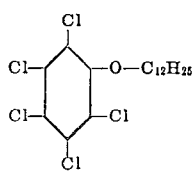

17. The method of protecting green logs and green lumber from attack by ambrosia beetles which comprises applying to said logs and lumber an ambrosiacide comprising an alkoxypolychlorobenzene as defined in claim 13.

18. The method of protecting green logs and green lumber from attack by ambrosia beetles which comprises applying to said logs and lumber an ambrosiacide comprising an alkoxypentachlorobenzene as defined in claim 14.

19. The method of protecting green logs and green lumber from attack by ambrosia beetles which comprises applying to said logs and lumber an ambrosiacide comprising a butoxypentachlorobenzene as defined in claim 15.

20. The method of protecting green logs and green lumber from attack by ambrosia beetles which comprises applying to said logs and lumber an ambrosiacide comprising a dodecoxypentachlorobenzene as defined in claim 16.

THOMAS S. CARSWELL.